United States Patent [19]

Alafandi et al.

[11] 4,215,016

[45] Jul. 29, 1980

[54] EXCHANGED FAUJASITE ZEOLITE CATALYST CONTAINING SAME AND PROCESS FOR PRODUCING SAME

[75] Inventors: Hamid Alafandi, Woodland Hills; Dennis Stamires, Newport Beach, both of Calif.

[73] Assignee: Filtrol Corporation, Los Angeles, Calif.

[21] Appl. No.: 874,754

[22] Filed: Feb. 3, 1978

Related U.S. Application Data

[63] Continuation-in-part of Ser. No. 808,268, Jun. 20, 1977, Pat. No. 4,164,483, which is a continuation-in-part of Ser. No. 718,166, Aug. 27, 1976, Pat. No. 4,085,069, and a continuation-in-part of Ser. No. 718,167, Sep. 8, 1976, Pat. No. 4,058,484.

[51] Int. Cl.$^2$ ............... B01J 29/04; B01J 29/08
[52] U.S. Cl. ............................. 252/455 Z; 423/112
[58] Field of Search .................. 252/455 Z; 423/112

[56] References Cited

U.S. PATENT DOCUMENTS 3,173,854   3/1965   Eastwood et al. ............... 252/455 Z

*Primary Examiner*—Carl F. Dees
*Attorney, Agent, or Firm*—Philip Subkow; Bernard Kriegel; Newton H. Lee, Jr.

[57] ABSTRACT

Exchanged zeolite of the faujasite type is produced by exchanging the sodium zeolite at super atmospheric pressures at temperatures below about 500° F. with salt solutions in ratios of cations in excess of an equivalent of the cation per equivalent of the sodium in the zeolite.

8 Claims, No Drawings

EXCHANGED FAUJASITE ZEOLITE CATALYST CONTAINING SAME AND PROCESS FOR PRODUCING SAME

This application is a continuation-in-part of application Ser. No. 808,268, filed June 20, 1977 now U.S. Pat. No. 4,164,483, which is a continuation-in-part of application Ser. No. 718,166 filed Aug. 27, 1976 now U.S. Pat. No. 4,085,069, and of application now U.S. Pat. No. 4,085,069 Ser. No. 718,167 filed Sept. 8, 1976, now U.S. Pat. No. 4,058,484.

BACKGROUND OF THE INVENTION

We have in the prior application, now U.S. Pat. No. 4,058,484 and in application Ser. No. 718,166 cited above disclosed that hydrothermally stable ammonium Y zeolites may be formed by exchange at superatmospheric pressures and suitable reactant ratios. Such zeolites form hydrothermally stable cracking catalysts of high activity.

We have also found that by controlling the pH of the admixture of rare earth and NaX, and NaY, and control of exchange process under such superatmospheric pressure, we obtain rare earth exchanged X faujasite zeolites which may be formulated into hydrothermally stable cracking catalysts of high cracking activity. Reference is made to application Ser. No. 808,268 and copending application Ser. No. 869,856 filed Jan. 16, 1978. The process results in an exchange of sodium to reduce the sodium content to a weight percentage based on the volatile free exchanged zeolite which may be 0.5% or larger without any substantial change in the crystal structure as evidenced by its $a_o$.

The disclosures in aforesaid patent and applications are hereby incorporated into this application by this reference.

The techniques for carrying out exchanges in the prior art have been described in the prior art (see Rabo "Zeolite Chemistry and Catalysis", page 309 and 310 published by the American Chemical Society in 1976 and see also U.S. Pat. Nos. 3,293,194, 3,402,996, 3,867,277, 3,281,199, 3,169,692 and 2,463,608). Such procedure has also been reported when using an X type zeolite (see U.S. Pat. No. 3,966,882). The literature in this art is extremely voluminous and this statement of the art is not intended to be exhaustive but for the purpose of placing the present invention in the historical perspective of this art.

STATEMENT OF THE INVENTION

The above exchange procedure is of general applicability both to the monovalent ammonium ion and to the to the polyvalent metallic cations which in addition to the rare earth may include the cations listed in the following groups of the Periodic Table according to the Handbook of Chemistry and Physics, 48th Ed. to wit: the metals of Group 1b, e.g. Cu and Ag, the alkaline earth elements of Group 2a, for example Ca and Mg, the metals of Group 2b, for example Zn and Cd, the metals of Group 3a, for example Al, the metals of Group 6b, for example Cr, Mo and W, the metals of Group 7b, for example Mn, and the metals of Group 8, for example Fe, Co. Ni,Pd and Pt.

Where the exchanged zeolites are to be formulated into a matrix to be formed into a cracking catalyst, we prefer to employ in the case of the Y zeolite, either $NH_4$ or rare earth cations or both $NH_4$ and rare earth in sequence, first $NH_4$ and then rare earth. In the case of the X zeolite, we prefer to employ the rare earth and not the ammonium cation. In the case of the Y zeolite, we have found the Cr ion to give a zeolite which when incorporated into the catalyst results in a catalyst of excellent thermal stability and high activity.

We accomplish this result by exchanging the zeolite of the faujasite type (X and Y) whose exchange position is substantially occupied by Na by a process of exchange of the sodium in the faujasite zeolite at a temperature far in excess of the temperatures of the boiling point of the reaction solution at atmospheric pressure. This temperature is attained by maintaining the reaction mixture in the exchange solution at superatmospheric pressures. The resultant zeolite, preferably after being washed substantially free of the anions of the exchange salt, may be incorporated into a matrix as will be described below.

In the process according to our invention, the sodium zeolites of the faujasite type are mixed with a solution of a salt of the cation to be exchanged for the sodium of the zeolite and at a pH adjusted to between about 3 and less than about 7. The mixture is exchanged at superatmospheric pressure so as to cause the exchange to occur at temperatures above 300° F. and preferably not more than about 500° F. We have also found that in order to produce the zeolites of low sodium level, for example, in the range of 1% or less, expressed as $Na_2O$ based upn the weight of the volatile free (VF) zeolite wihout a substantial destruction of the crystallinity of the zeolite, it is desirable to maintain a high ratio of the equivalents of the rare earth cation to the sodium in the zeolite.

The temperature should be from about 300° F. and less than 500° F. and preferably between about 350° F. and about 450° F., and the ratio of the equivalents of the cation, in the solution employed, to the equivalents of sodium originally in the zeolite charged to the reaction mixture, depends on the level of the residual Na which is to be attained. We prefer to carry out the reaction for exchange to levels of Na, as $Na_2O$ of about 1% or substantially less, within the range in substantial excess of one equivalent of exchange cation per equivalent of sodium ion in the sodium zeolite employed in the reaction mixture. We may obtain this ratio by adjusting the concentration of the zeolite solids in the reaction mixture and the concentration of cation entering the exchange.

We have also found that it is desirable to adjust the pH of the mixture of the zeolite and the salt so that the hydroxide or hydrated oxide of the metallic cation of the salt is not precipitated and also that the solution is not excessively acid as to attack the zeolite. Depending on the salt, the pH of the mixture should be substantially above 3.

Under these conditions, we have been able to obtain an X and Y zeolite having the silica to alumina ratio and $a_o$ characteristic of the processed X and Y zeolites respectively as herein described, with sodium expressed as $Na_2O$ based on the exchanged zeolite, volatile free for example, from less than 0.5%. The process does not result in any substantial impairment of the crystallinity of the exchanged zeolite and results in replacement of the original sodium content by the exchange cation, e.g., about 0.95 or more equivalents per gram atom of aluminum are occupied by metallic cations with substantially less than 0.1 equivalent occupied by Na.

The crystallinity of the exchanged zeolite was substantially the same as the crystallinity of the sodium X (U.S. Pat. No. 2,882,244) or Y (U.S. Pat. No. 3,130,007) as evidenced by their X-ray patterns with substantially the same $a_o$ value as the X or Y entering the exchange process. The resultant product shows excellent thermal and hydrothermal stability.

The preferred catalysts contain an exchanged X or Y zeolite at least one equivalent of metal cation per gram atom of aluminum, for example about 0.9 or more equivalents of ReO and 0.1 or less equivalents of Na per gram atom of aluminum theoretical cation density. The sum of the Na and Rare earth oxide (ReO) may be about 1 or more equivalent per gram atom of aluminum in the exchange product, and preferably when the rare earth cation density is itself of about 1 or more for example between 1 and 2 equivalents per gram atom of aluminum in the exchanged zeolite. The X-ray spectrum of the exchange zeolite shows no separate rare earth compounds. While we do not wish to be bound by any theory, the observed facts are consistent with the view that the rare earth is associated with an exchange site.

The catalyst is preferably produced by spray drying a slurry of the above zeolite, and a matrix, e.g., containing clay, the slurry composition being such as to give a spray dried product of microspheres of about 50 to 70 micron average diameter.

The matrix may also contain hydrated alumina in the form of pseudoboehmite or other hydrated oxides or mixed oxide gels.

It may be formulated into a pellet, tablet or extruded form by means well known in the art employing matrixes such as used for catalysts containing exchanged faujasites.

The cracking activity of the catalysts are determined by a Microactivity Test (see Oil and Gas Journal, 1966, Vol. 64, No. 39 p. 7, 84, 85 and Nov. 22, 1971, pp. 60–68).

In order to test the thermal stability of the catalyst, and, therefore, its resistance to the high temperature and steam conditions encountered in commercial cracking operations, it is subjected to high-temperature steam treatment prior to being subjected to the bench-scale tests. Prior to subjection the catalyst to the above tests, separate samples are steamed at a high temperature. When the temperature of the steaming is 1450° F. for 2 hours. The cracking results are referred to as M activity. When the temperature of the steaming is 1500° F. for 2 hours, the test results are referred to as S activity. When the temperature of steaming is 1550° F. for 2 hours, the test results are referred to as S+ activity.

The following examples illustrate the application of the process of our invention to produce polyvalent exchanged Y zeolites.

EXAMPLE 1

400 grams (volatile free basis) of a NaY (13% $Na_2O$, $SiO_2/Al_2O_3 = 4.7$) ($a_o = 24.71$ Å) was slurried in water and mixed with rare earth sulfate solution. 252 grams of rare earth sulfate were dissolved in 19,600 ml of $H_2O$. The composition of the rare earth was such that the ratio of the equivalents of rare earth per equivalent of Na in the zeolite in the reaction mixture was 2.8. The solution was added slowly to the zeolite slurry and the pH was maintained at a pH of 5 to 5.5 during the addition by addition of dilute $H_2SO_4$. After the rare earth sulfate had been added, the resultant slurry mixture was autoclaved for a period of 3 hours at a temperature of 335° F. The product was filtered and washed substantially free of sulfate ion.

The product analyzed as follows:
$Na_2O = 0.35\%$
$Al_2O_3 = 22.7\%$
$SiO_2 = 56.7\%$
$ReO = 19.7\%$
$SO_3 = 0.26\%$ The $a_o$ of the exchanged zeolite was 24.71 Å.

The exchanged zeolite was formulated by mixing the zeolite and alumina and clay in a slurry and spray during the slurry as follows:
ReO exchanged zeolite = 19%
pseudoboehmite (hydrated alumina) = 18%
acid treated halloysite = 16%
Ball clay = 47%

Tested by the above microactivity test it gave the following results:

| Conversion % | M | S | S+ |
|---|---|---|---|
| | 79.6 | 73.3 | 67.9 |

EXAMPLE 2

The procedure in all of the following examples for the exchange of the zeolite, except as specified in the example, was carried out as follows:

The X zeolite had the following anhydrous molar composition: $Na_2O:Al_2O_3:2.5\ SiO_2$ and an $a_o$ of 24.9 Å.

500 grams of the above sodium X containing 19.7% $Na_2O$ was dispersed at 3,000 milliliters of water. The dispersed zeolite was titrated to a pH of 8.0 with a 25% sulfuric acid solution. The slurry was filtered and washed. A rare earth sulfate solution was prepared by dissolving the above rare earth sulfate in water and diluted to 13,500 milliliters by dilution. The weight of the rare earth sulfate employed is sufficient to provide the amounts specified in each of the following examples. The zeolite filter cake produced as above was dispersed in the rare earth sulfate solution adding it at the rate to maintain the pH in the range of about 5 to 6 as specified in each of the following examples. The mixture was then introduced into the autoclave and heated to the temperature specified in each of the examples for the periods therein specified. After the elapse of time the slurry was cooled, filtered and washed sulfate free. It may be dried and it may be mixed with the matrix as described below, before or after drying.

EXAMPLE 3

The zeolite exchanged as described in Example 2 was incorporated into a matrix. The matrix was produced as follows:

A hundred grams of hydrated alumina, (pseudoboehmite) was peptized with 1.057 liters of water per hundred grams of alumina to which had been added 9.5 milliliters of 100% formic acid per 1.057 liters with moderate stirring for about thirty minutes. To this mixture was added 309.5 grams of ball clay per 100 grams of alumina on a volatile free basis and 100 grams of pseudoboehmite referred to above and the mixture was vigorously stirred for about fifteen minutes. To the resultant mixture was added the exchanged zeolite produced as above in the proportions as specified in each of the examples with vigorous agitation. The mixture was spray dried to give particles of about 70 micron average diameter and containing about 15% volatile matter.

EXAMPLE 4

The autoclave charge was made up according to the procedure of Example 2. The ratio of the rare earth sulfate to the sodium zeolite on a volatile free basis was 172.5 grams of rare earth oxides (ReO) to 500 grams of the zeolite. This is equivalent to a dosage of 34.5%, i.e. 34.5 grams of rare earth oxides to 100 grams of zeolite both volatile free. This is substantially 1 equivalent of ReO per equivalent of Na in the zeolite. The pH of the slurry prior to the autoclaving was adjusted to 5.4 and the slurry was autoclaved at 300° F. for two hours. The exchange zeolite on a volatile free basis analyzed as follows:

$Na_2O$:1.84% by weight
ReO:25.9% by weight
$SiO_2$:44.3% by weight
$Al_2O_3$:27.7% by weight This is equivalent to 0.109 equivalent of Na per 1 gram atom of aluminum in the product and 0.809 equivalent of ReO per one gram atom of aluminum in the product. The zeolite was incorporated into the matrix according to the procedure of Example 2. The composition of the catalyst on a volatile free basis was thus 19% of the zeolite, 18% of the alumina, 47% of the ball clay and 16% of acid treated halloysite. The micro activity of the catalyst was as follows:

| M | S | S+ |
|---|---|----|
| 49.6% | 30.8% | 18.7% |

EXAMPLE 5

The procedures of Example 2 and 3 were followed. The pH was held at 5.7 and the volume was 3.57 gallons. It was autoclaved for two (2) hours at a temperature ranging from 300° F. to 310° F.

The zeolite analyzed on a volatile free basis is as follows:

$Na_2O$:2.03% by weight
ReO:26.4% by weight
$SiO_2$:41.6% by weight
$Al_2O_3$:29.4% by weight This is equivalent to 0.12 equivalents of sodium per 1 gram atom of aluminum in the product and 0.87 equivalents of ReO per 1 gram atom of aluminum in the product. The exchange zeolite was incorporated in the matrix according to Example 2, except that the acid treated halloysite was replaced by an equal amount of silica-alumina gel and the micro activity of the catalyst was as follows:

| M | S | S+ |
|---|---|----|
| 76.2% | 57.8% | 29.2% |

EXAMPLE 6

The procedure of Example 5 was followed and the pH in this case and adjusted to 5.2. Duplicate samples of the exchanged zeolite analyzed as follows on a volatile free basis averaged:

|  | Sample 1 |  | Sample 2 |  |
|---|---|---|---|---|
| $Na_2O$ | = 1.84% | and | 1.84% | by weight |
| ReO | = 25.9% | and | 26.3% | by weight |
| $SiO_2$ | = 44.3% | and | 44.2% | by weight |
| $Al_2O_3$ | = 27.7% | and | 27.5% | by weight |

The equivalent of sodium was 0.11 sodium per gram atom of aluminum in the product and that of the ReO was 0.90 per gram atom of aluminum in the product. The exchanged zeolite was incorporated in the matrix according with Example 2 and the micro activity of the catalyst was:

| M | S | S+ |
|---|---|----|
| 67.3% | 46.6% | 26.1% |

EXAMPLE 7

The procedure of Example 2 was followed but in this case the dosage was 45% of the rare earth oxide, i.e., 45 grams of the rare earth oxide volatile free per 100 grams of the sodium X volatile free. This is equivalent to about 1.3 equivalents of ReO per gram atom of Al in the sodium X. The attained pH was 5.3. The slurry was autoclaved for 4 hours at a temperature ranging from 337° F. to 343° F. The product on a volatile free basis analyzed as follows:

$Na_2O$=1.34% by weight
ReO=27.6% by weight
$SiO_2$=41.6% by weight
$Al_2O_3$=28.7% by weight This is equivalent to 0.076 equivalent of sodium per gram atom of aluminum in the product and 0.924 equivalent of ReO per 1 gram atom of aluminum in the product. The zeolite was incorporated in the matrix according to Example 2 except that the nominal concentration of the zeolite was 20% with a proportionate reduction in the clay component. The micro activity of the catalyst was:

| M | S | S+ |
|---|---|----|
| 65.2% | 47.4% | 30.4% |

Another sample of the exchanged zeolite according to this example was incorporated in the matrix according to Example 2, but in this case, the concentration of the zeolite was 25%. The micro activity of the catalyst was as follows:

| M | S | S+ |
|---|---|----|
| 68.5% | 39.9% | 27.4% |

EXAMPLE 8

The procedure of Example 2 was followed but the rare earth salt was cerium chloride ($CeCl_3$). The dosage was 45% as in Example 6 and the pH prior to autoclaving was 6.1. It was autoclaved for 4 hours at 338° F. The product analyzed on a volatile free basis as follows:

$Na_2O$=0.48% by weight
ReO($Ce_2O_3$)=30.2% by weight
$SiO_2$=39.9% by weight
$Al_2O_3$=30.2% by weight The equivalent of sodium per gram atom of aluminum in the product was 0.025 and for the cerium it was 0.93 per 1 gram atom of aluminum in the product. The zeolite was incorporated in the matrix according to Example 2 except that the concentration of the zeolite was 23% with a proportionate reduction in the clay component and the micro activity was:

| M | S | S+ |
|---|---|---|
| 69.9% | 46 | 29.7 |

EXAMPLE 9

The procedure of Example 8 was followed except that the salt was lanthanum chloride $LaCl_3$. The zeolite on a volatile-free basis analyzed as follows:
$Na_2O32$ 0.48% by weight
$ReO(La_2O_3)$=29.6% by weight
$SiO_2$=40.4% by weight
$Al_2O_3$=29.2% by weight The equivalents of sodium per gram atom of aluminum in the products was 0.026 and the equivalents of ReO per gram atom of aluminum in the product was 0.92. The exchanged zeolite was incorporated in the matrix according to Example 7. The micro activity of the catalyst was:

| M | S | S+ |
|---|---|---|
| 68.8% | 63.5% | 33.5% |

EXAMPLE 10

The procedure of Example 2 was followed except that the dosage was 54%, i.e., 54 grams of rare earth oxide volatile-free per 100 grams of sodium X volatile-free. This is equivalent to about 1.6 equivalents of rare earth per gram atom of Al in the sodium X. The pH of the slurry prior to autoclaving was 6.1 and the slurry was autoclaved for four hours at 338° F. The zeolite analyzed as follows:
$Na_2O$=0.315% by weight
ReO=33.5% by weight
$SiO_2$=37% by weight
$Al_2O_3$=27.5% by weight The equivalent of sodium per gram atom of aluminum in the product was 0.018 and the equivalent of ReO per gram atom aluminum in the product was 1.17. The zeolite was incorporated in the matrix according to Example 2 in the following proportions; the clay component being adjusted accordingly:
Sample
 a(1)=19% on a volatile-free basis
 a(2)=19% on a volatile-free basis
 a(3)32 19% on a volatile-free basis
Sample
 b(1)=22% on a volatile-free basis
 b(2)=22% on a volatile-free basis
Sample
 c(1)=23% on a volatile-free basis
 c(2)=23% on a volatile-free basis
 c(3)=23% on a volatile-free basis
Sample
 d(1)=25% on a volatile-free basis
 d(2)=25% on a volatile-free basis Each of the catalysts was tested for micro activity with the following average results:

| Conversion % | | M | S | S+ |
|---|---|---|---|---|
| Sample | a(1) | 69.2 | 62.8 | 32.4 |
|  | a(2) | 71.5 | 67.5 | 34.2 |
|  | a(3) | 73.7 | 67.5 | 38.5 |
|  | b(1) | 69.4 | 60.6 | 33.6 |
|  | b(2) | 70.2 | 64.8 | 33.3 |
|  | c(1) | 68.8 | 63.5 | 33.5 |
|  | c(2) | 69.9 | 51.4 | 29.7 |
|  | c(3) | 71.8 | 63.2 | 32.4 |
|  | d(1) | 65.9 | 69.2 | 30.4 |
|  | d(2) | 73.3 | 65.8 | 38.7 |
|  | Av | 70.4 | 63.6 | 33.7 |

The following table illustrate the discovery.

TABLE 1

| | Zeolite Composition Equivalents Per Gram Atom of Al | | Micro Activity | | |
|---|---|---|---|---|---|
| Example | Na | ReO | M % | S % | S+ % |
| 1 | 0.027 | 0.84 | 79.6 | 73.3 | 67.9 |
| 4 | 0.11 | 0.89 | 49.6 | 30.8 | 18.7 |
| 6 | 0.11 | 0.90 | 67.3 | 46.6 | 26.1 |
| 7 | 0.076 | 0.924 | 65.2 | 47.4 | 30.4 |
| 8 | 0.025 | 0.93 | 69.9 | 46. | 29.7 |
| 9 | 0.026 | 0.92 | 68.8 | 63.5 | 33.5 |
| 10 | 0.018 | 1.17 | 70 | 64 | 34 |

The data of Example 10 shows that within the limits of the experimental data the S+ activity of the exchanged zeolite is independent of concentration of the zeolite in the catalyst in the range of 19 to 25% and the average value of the micro activity for this example is given above.

As will be observed from the above Table 1, the S+ activity of catalysts employing zeolites containing various ratios of the equivalents of rare earth to one gram atom of aluminum in the zeolite product shows an increase in the M,S and S+ activity when the equivalents of ReO per gram atom of aluminum in the product exceeds about 0.9 equivalents of ReO per gram atom of aluminum in the product. The S+ activity rises to the range of about 18 at 0.89 to about 34 at about 0.92 or 0.93 equivalents ratio. The increase of the ratio results in a substantial improvement in the M activity.

The alkaline earth exchanged zeolite may be incorporated into a matrix to produce a cracking catalyst by the procedure described above for the ammonium exchanged zeolite.

EXAMPLE 11

NaY (see supra Example 1) was exchanged at a temperature of 350° F. employing sufficient $CaCl_2$ to establish 14 equivalents of Ca per equivalent of Na in the zeolite in the mixture which is autoclaved at 350° F. The Na content of the exchanged zeolite, expressed as $Na_2O$ on a volatile-free basis was 0.4% representing an exchange of 97% of the Na in the NaY.

EXAMPLE 12

The NaX of Example 2 was exchanged as in Example 11 and produced a zeolite containing Na expressed as $Na_2O$ 0.86% $Na_2O$ on a volatile-free basis as representing 96% exchange.

EXAMPLE 13

The exchange of Example 11 was carried out but with MgCl$_2$ instead of CaCl$_2$ and resulted in a zeolite containing Na, expressed as Na$_2$O on a volatile-free basis of 0.86% representing 96% exchange.

EXAMPLE 14

An X zeolite containing 19% Na$_2$O was exchanged with (NH$_4$)$_2$SO$_4$ employing 14.4 equivalents of NH$_4$ per equivalent of Na in the NaX at a temperature of 340° F. The sodium content resultant product as Na$_2$ on a volatile-free basis was 0.46% and contained 9% of NH$_3$. The procedure, except for the zeolite, was the same as in Example 1 of U.S. Pat. No. 4,058,484.

When formulated into a matrix as in Example 2, the micro-activity was:

| M   | S   | S+  |
|-----|-----|-----|
| 39% | 31% | 27% |

The activity is comparable to that of the rare earth zeolite catalyst of Example 4.

EXAMPLE 15

NaY (see Example 1) was exchanged with CrCl$_3$ employing sufficient chromium chloride equivalent to 33.1 grams expressed as Cr$_2$CO$_3$ per 100 grams of NaY on a volatile free basis, i.e., 3.14 equivalents of Cr per equivalent of Na. The CrCl$_3$ solution was first adjusted to a pH of 3.5 to 3.8 with NH$_4$OH.

It was then mixed with the NaY by adding the adjusted CrCl$_3$ to the NaY slurry, slowly, adjusting the pH of the solution by addition of NH$_4$OH to maintain the pH at 3 to 3.5 during the addition. The slurry of the zeolite and salt at the above pH was autoclaved at 340° F. The exchange zeolite analyzed Na$_2$O=0.22% Cr=7.5%. The a$_o$ appeared unchanged.

When formulated into a catalyst according to Example 1 with the CrY replacing equal weight of ReOY, the catalyst had the following activity:

| M     | S+    |
|-------|-------|
| 72.3% | 32.2% |

We claim:

1. A method of producing an exchanged zeolite of the faujasite type which comprises mixing a sodium zeolite of the faujasite type with a solution of a salt of a member of the group consisting of ammonium and the metals of the groups 1b, 2a, 2b, 3a, 6b, and 7b, of the periodic system, and two or more thereof, the quantity of the zeolite, and the concentration of the cations, being in quantity sufficient to establish a ratio of the equivalents of cation in the solution at super atmospheric pressure, per equivalent of Na cation in the zeolite in the mixture in excess of about 1, heating the solution to a temperature in the range of about 300° F. and up but less than about 500° F. for a period of time to reduce the sodium content of the zeolite, expressed as Na$_2$O, to less than about 0.1 equivalents per gram atom of Al in the exchanged zeolite, and washing the zeolite substantially free of anions of the salt in solution.

2. The process of claim 1 in which the exchanged cation is an alkaline earth cation.

3. The process of claim 1 in which the exchange cation is chromium.

4. The process of claim 1 in which the zeolite is a X zeolite and the exchange cation is NH$_4$.

5. The process of claim 1, in which the crystallinity of the exchanged zeolite is substantially the same as the Na zeolite which has been exchanged in the reaction.

6. The process of claim 5 in which the exchange cation is an alkaline earth cation.

7. The process of claim 5 in which the exchange cation is chromium.

8. The process of claim 5 in which the zeolite is an X zeolite and the exchange cation is NH$_4$.

* * * * *